Jan. 4, 1966  N. J. ZERILLI  3,226,732
APPLIQUE ARTICLE AND METHOD OF MANUFACTURE
Filed April 29, 1964
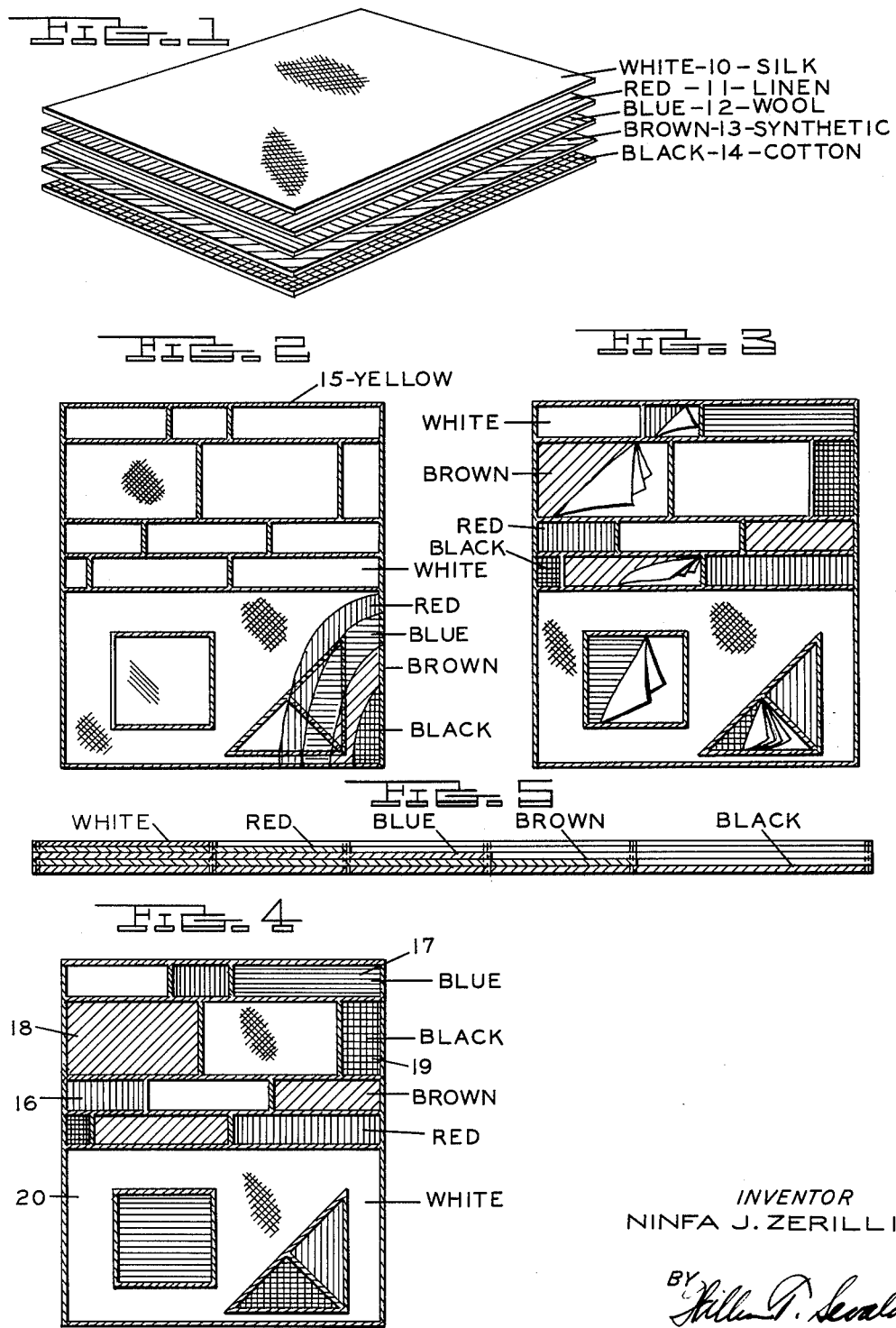
INVENTOR
NINFA J. ZERILLI
ATTORNEY

United States Patent Office 3,226,732
Patented Jan. 4, 1966

3,226,732
APPLIQUE ARTICLE AND METHOD OF MANUFACTURE
Ninfa J. Zerilli, 4331 Dickerson Ave., Detroit, Mich.
Filed Apr. 29, 1964, Ser. No. 363,563
2 Claims. (Cl. 2—243)

This invention relates to an applique article of manufacture and to a novel method of producing applique articles particularly suitable for skirts, dresses, panels, bathing suits, curtains, drapes, and other articles where ornamental embellishment is very desirable.

Various types of applique are known in the prior art where pieces of cloth are sewed to a backing layer of material by hand. In the hand sewing, unless the person is exceedingly expert, the outline of the stitched design becomes irregular as the small pieces of cloth being sewed to the backing layer are very difficult to handle and become twisted and crumbled in the process of sewing them to the backing layer. Usually basting is necessary. This is also a very time consuming and exceedingly tedious operation in that each small piece of material must be cut out and laid on the backing sheet or layer and then sewed thereto with great care around the edges of the various small pieces of overlaid material. While the very expertly executed prior art appliques are attractive, they usually do not have the embellishing aspects of an expertly outlined design. They also lack conformity and regularity in the stitching which detracts from the general and overall visual aspect of the finished applique.

With the foregoing in view it is a primary object of the invention to provide a method of manufacturing applique and an applique article of manufacture which is simple in design and construction, inexpensive to make, easy to fabricate, and which is capable of intricate, accurate ornamental stitched design organization and execution.

An object of the invention is to provide a suitable number of layers of cloth in a laminate with the layers being different from one another as to material, texture, and color.

An object of the invention is to stitch the finished design outline through the entire laminate of cloth layers.

An object of the invention is to provide ornamental stitching through the entire laminate of cloth layers so that the stitching may be made on an automatic sewing machine or a manually operated machine as desired.

An object of the invention is to form enclosed ornamental panels in the design by the stitching.

An object of the invention is to cut out portions of superposed cloth layers in the stitched laminate so as to expose substrate layers to view within various panels of the stitched design.

An object of the invention is to reveal substrate layers within the stitched design as indented panels in the design of different material, color, and texture.

An object of the invention is to provide applique having ornamental designs stitched into a cloth laminate of various materials, colors, and textures which may be sold in the uncutout form and subsequently cut out as desired by a purchaser.

An object of the invention is to provide a method of making applique and an applique article of manufacture which eliminates the time consuming basting of small pieces of cloth on a backing layer and then cutting off the excess material after the design or piece of material has been individually sewed on the backing sheet as a portion of the design.

These and other objects of the invention will become apparent by reference to the following description of the applique article of manufacture and the method of making same embodying the invention taken in connection with the accompanying drawing in which:

FIG. 1 is a perspective view of spaced superposed cloth layers showing the laminate integration prior to stitching.

FIG. 2 is a plan view of the laminate seen in FIG. 1 after the laminate is stitched together.

FIG. 3 is a view similar to FIG. 2 showing some of the upper layers of the laminate cutout within the sewed design and other layers partially cut out.

FIG. 4 is a view similar to FIGS. 2 and 3 with the desired upper layers of the laminate cut out to reveal various selected substrate layers as panel portions of the finished design of the applique; and FIG. 5 is an enlarged schematic cross-sectional view, such as taken through FIG. 4, showing the laminate and cut-out panels illustrating the indented panels of different materials and colors in the applique.

Referring now to the drawing wherein like numerals refer to like and corresponding parts throughout the several views, the applique article of manufacture disclosed therein to illustrate the invention comprises a geometric design for ease of illustration. It will be understood that flowers, figures, leaves, animals, ships, and other designs may be employed by outlining them with the stitching and that the stitching interconnects the various layers of the laminate. The stitching through the laminate may be ornamental in nature and be a portion of the design wherein the color of the thread may be contrasting or of various and different colors as organized as a part of the design. Obviously, the stitching may also be used for merely outlining the design and have more or less hidden characteristics. After the design has been sewed through the laminate it establishes sewed panels through the laminate. The upper layers of the laminate may then be cut-out inside the sewed outline of the design to reveal various substrate layers as panels in the design.

More particularly, cloth layers 10, 11, 12, 13 and 14 may be superposed upon one another. For purposes of illustration they are designated respectively as white, red, blue, brown, and black. Also for purposes of explanation they may be of different materials such as silk, linen, wool, synthetic fiber, and cotton respectively. The laminate as shown in FIG. 1 is stitched together as shown in FIGS. 2–5 by stitches 15 of thread which may be contrasting color such as yellow. The stitched design may be of any kind. When a geometrical design is employed as shown in the drawings, the stitching is made in the desired form such as shown.

After the stitching has been completed the design is organized and integrated through the entire laminate of cloth layers.

After the stitching has been completed, various superposed layers of the laminate may be cut out within stitched panels to reveal selected substrate layers as panels in the design. The user cuts out a superposed layer or layers above a selected substrate layer desired to be exposed as a panel in the design. This is illustrated in FIG. 3 wherein the user may employ a scissors and cut the superposed layers by cutting along the stitches 15 to remove the upper layers of material above the selected substrate layer. Thus the user may selectively remove within a stitched panel one or more of the superposed layers as illustrated.

In panel 16, FIG. 4 the top white layer 10 has been removed to reveal the red cloth layer 11. In panel 17 the layers 10 and 11 have been removed to reveal the blue cloth layer 12. In panel 18 the upper layers 10, 11, and 12 have been removed to reveal the brown cloth layer 13. In panel 19 the upper layers 10, 11, 12, and 13 have been removed to reveal the black cloth layer 14. In panel 20 none of the layers have been removed leaving the white top cloth layer 10 to view in the design.

It will be noted in FIG. 5 that the applique design and indented panels are shown schematically to graphically illustrate the indentation of the panels and the complete integration of the sewed design through the laminate. It will be understood that the indented panels are highly embellishing and that the design may be sewed accurately with expert design conformity without basting and employing small pieces of material. Moreover a relatively thick applique is achieved giving substance to the finished product which is highly ornamentally embellished by the indented panels, sewed outline, and contrasting materials, colors, and textures.

Although but a single embodiment of the invention has been shown and described in detail, it is obvious that many changes may be made in the size, shape, detail, and arrangement of the various elements of the invention within the scope of the appended claims.

I claim:

1. The process of making applique comprising, superposing a plurality of layers of cloth in a laminate; said cloth layers being of various selected colors, textures, and materials; said laminate having a face side and a back side; sewing through said laminate with thread in stitches; said thread and stitches of said sewing being so arranged so as to form a visible design outline on said face side of said laminate; said face side visible design being integrated through the substrate cloth layers below said face side; and cutting out selected upper layers of the cloth at said face side above said back side within selected portions of the sewed design to expose selected substrate layers of cloth to view as panels within said sewed design outline to visually present a design pattern at said face side composed of said sewed design, said exposed panels, and the remaining portions of said face layer.

2. An applique comprising, a plurality of layers of cloth in a laminate; said cloth layers being of various selected colors, textures, and material; said laminate having a back side and a face side; and thread stitches sewed through said laminate forming a raised design outline through said cloth layers of said laminate visible at said face side; selected portions of said face layer and substrate layers being removed within said sewed design outline to reveal within the sewed design outline selected portions of selected substrate layers as indented panels together with remaining portions of said face layer.

References Cited by the Examiner

UNITED STATES PATENTS

| 683,302 | 9/1901 | Lee | 161—40 |
| 1,355,177 | 10/1920 | Sollen | 112—420 |

FRANK J. COHEN, *Primary Examiner.*

JORDAN FRANKLIN, *Examiner.*

A. R. GUEST, *Assistant Examiner.*